US006859286B2

(12) United States Patent
Mukherji

(10) Patent No.: US 6,859,286 B2
(45) Date of Patent: Feb. 22, 2005

(54) PRECISION VIDEO GAUGING MACHINE FOR VERTICALLY ORIENTED WORKPIECES

(76) Inventor: Bipin Mukherji, 17031 Septo St., Northidge, CA (US) 91325

( * ) Notice: Subject to any disclaimer, the term of this patent is extended or adjusted under 35 U.S.C. 154(b) by 357 days.

(21) Appl. No.: 09/819,871

(22) Filed: Mar. 28, 2001

(65) Prior Publication Data

US 2003/0020927 A1 Jan. 30, 2003

(51) Int. Cl.[7] .............................................. G01B 11/00
(52) U.S. Cl. .................................................... 356/614
(58) Field of Search ................................. 356/614–624, 356/399–401, 138–139

(56) References Cited

U.S. PATENT DOCUMENTS 5,712,706 A * 1/1998 Castore et al. ............... 356/394
6,518,996 B1 * 2/2003 Polidor et al. ................ 348/95

2001/0005204 A1 * 6/2001 Matsumoto et al. ........ 345/418

* cited by examiner

Primary Examiner—Tu T. Nguyen
(74) Attorney, Agent, or Firm—Matthew F. Jodziewicz

(57) ABSTRACT

An improved precision video gauging machine system for measuring a workpiece that includes a base structure that has mounted on it a carriage for supporting the workpiece that is to be measured. The carriage is vertically movable with respect to the base and carries the workpiece with it. A column, which is horizontally movable with respect to the base structure, has a video based coordinate measuring system mounted on it. Such a video based coordinate measuring system would include a video camera that produces a video signal having a first optical axis and a focal plane where an image of the workpiece to be measured is focused. The camera is mounted to move horizontally with respect to the workpiece to be measured and generates an image in the form of a plurality of pixels. A video monitor that is responsive to the video signal is connected to the video camera and displays an image of the workpiece being on the focal plane for an operator to measure.

1 Claim, 2 Drawing Sheets

PRECISION VIDEO GAUGING MACHINE FOR VERTICALLY ORIENTED WORKPIECES

BACKGROUND OF THE INVENTION

1. Field of the Invention

The present invention is in the field of machines used to inspect the alignment and location of various articles and generally relates to those machines known as optical coordinate measuring machines. More particularly it pertains to a precision video gauging machine machine for measuring relatively small or relatively lightweight workpieces that are mounted for movement in a vertical relationship to a base element plane to a base element while an optical measuring system is being operated in a horizontal relationship to the base element for benefits and reasons being explained and expanded upon below.

2. Description of the Prior Art

Coordinate measuring machines are well known in the art. Two main types of such coordinate measuring machines are the probe type and the optical type.

The probe type coordinate measuring machine typically has a probe mounted on a probe shaft, which is movable along a first axis to make measurements of a part. The probe shaft is typically mounted to a carriage which is movable along a second axis orthogonal to the first axis. The second axis is typically mounted to a carriage which is movable along a second axis orthogonal to the first axis. The second axis is typically movable along a third orthogonal axis, thus allowing the probe to take measurements in all three coordinate axes. The movement of the probe or carriage is accomplished either manually in one type of machine, where an operator grasps the probe shaft and physically moves it in the desired direction, or automatically in a more sophisticated type of machine where it is moved by an automatic controller driving a motor on each axis.

The optical type of coordinate measuring machine typically provides for relative motion (along three Cartesian coordinate axes) between a workpiece to be measured and a video camera, a laser ranging device, or laser triangulation device used similar to the mechanical touch probe described above. A well known type of optical coordinate measure machine is the projection type where a workpiece is placed on a horizontal table that is illuminated from underneath and the outlines of the workpiece are projected onto a screen for an operator. The operator moves a device, usually a camera, over the illuminated workpiece marking points of interest and an associated mechanical or computer system keeps track of the movement of the device for telling the operator the coordinates selected and their relative position to a known or selected datum.

Recently some coordinate measuring machines have attempted to combine both the touch probe and video imaging mechanisms by including touch probes and laser imaging devices. However, these hybrid machines are typically just two inspection devices mounted side by side.

By way of example, the prior art includes U.S. Pat. No. 4,305,207 to Lantz discloses a three axis inspection machine; U.S. Pat. No. 4,503,614 to Tuss provides a coordinate measuring machine having vertical fine fee and lock mechanism for its probe shaft; U.S. Pat. No. 4,651,426 to Band et al. provides a portal type coordinate measuring machine; U.S. Pat. No. 5,825,666 to Freifeld provides an optical coordinate measuring machine using an optical touch probe; U.S. Pat. No. 6,058,618 to Hemmelgarn et al. teaches a coordinate measuring machine with a gantry structure.

Each of these types of coordinate measuring machines has its benefits and drawbacks in practical use over the wide range of workpieces that a common in industry. For example, these coordinate machines typically lay the workpiece to be measured on a horizontally movable table and utilize a gantry type structure for moving the coordinate measuring probe or camera vertically over the workpiece. Thus, it is obvious that the table on which the workpiece is laid must be sufficient to support the weight of the workpiece. However, this is a factor in limiting the type of workpieces that me measured because such tables must also allow for illumination of the workpiece from the bottom. Typically such inspection tables have their central portion made of glass or a translucent plastic material to allow such bottom illumination of the workpiece. Warnings are common that workpieces above certain specified weight limits would damage the inspection table as the central portion cannot support such heavy items. Likewise, many workpieces when laid on the inspection tables have pressure or stress points that exert or concentrate the weight of the workpiece into a small area, causing damage to the surface of the inspection table and the uniformity of the illumination source, thereby potentially causing inaccuracies in the measuring system of the machine. In summary then, the need to illuminate the workpieces from underneath on such inspection tables limits the weight that can be placed on such inspection tables and hence the range of workpieces that can be measured.

Secondly, the gantry type structures used to hold and move the measuring probe, be it mechanical, touch or optical, limits the vertical size of workpiece that can be measured with the machine. Large or deep workpiece configurations simply cannot fit under the gantry structure and therefore cannot be measured by the machine.

Third, especially in the projection type of coordinate measuring machines mentioned above, changing lenses on the camera to accommodate various sized workpieces with the optical projection system, is both inefficient, as it is time consuming, and costly, as many expensive lenses must be purchased and maintained.

Therefore, it can be appreciated that in modem manufacturing where quality control is becoming of paramount importance in mass manufacturing of items on a worldwide basis from many different countries and plants, there exists a continuing need for a new and improved coordinate measuring machine for providing accurate measurements for quality control information that is both easy to use, adaptable to the wide range of potential workpieces, durable, and that overcomes the limitations of the prior art as to the deficiencies noted above as well as to other aspects of the prior art as is better described below.

OBJECTS AND SUMMARY OF THE INVENTION

In view of the foregoing disadvantages inherent in the known types of coordinate measuring machines now present in the prior art, the present invention provides an improved precision video gauging machine system for measuring a workpiece that includes a base structure that has mounted on it a carriage for supporting the workpiece that is to be measured. The carriage is vertically movable with respect to the base and carries the workpiece with it. A column, which is horizontally movable with respect to the base structure, has a video based coordinate measuring system mounted on it. Such a video based coordinate measuring system would include a video camera that produces a video signal having a first optical axis and a focal plane where an image of the workpiece to be measured is focused. The camera is mounted to move horizontally with respect to the workpiece to be measured and generates an image in the form of a plurality of pixels. A video monitor that is responsive to the video signal is connected to the video camera and displays an image of the workpiece being on the focal plane for an operator to measure. As such, the general purpose of the present invention, which will be described subsequently in greater detail, is to provide a new and improved system and method of providing coordinate measurements of a workpiece, which has all the advantages of the prior art and none of the disadvantages.

There has thus been defined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components or steps set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new precision video gauging machine machine and method for providing coordinate measurement data of a workpiece which has all the advantages of the present coordinate measuring machines methods and none of the disadvantages.

It is another object of the present invention to provide a new precision video gauging machine machine and method for providing coordinate measurement data of a workpiece which may be easily and efficiently manufactured and marketed.

It is a further object of the present invention to provide a new precision video gauging machine machine and method for providing coordinate measurement data of a workpiece which is of a durable and reliable operation.

An even further object of the present invention to provide a new precision video gauging machine machine and method for providing coordinate measurement data of a workpiece whose design, method and structure are simplified for the users, while security and accuracy of data is increased.

Lastly, it is an object of the present invention to provide a new precision video gauging machine machine and method for providing coordinate measurement data of a workpiece which is transparent and easy to use for users.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is an illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
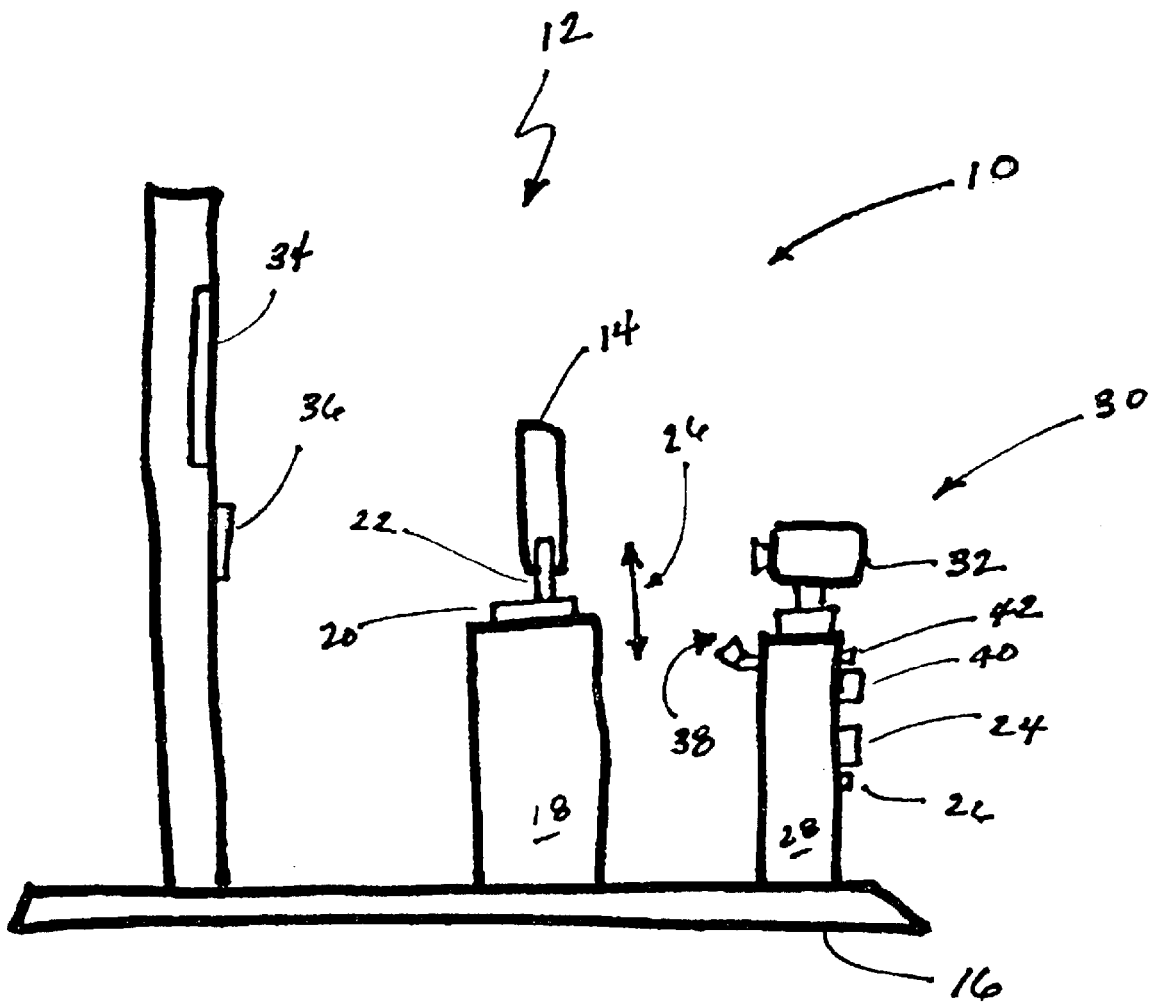
FIG. 1 is a side plan view illustrating a coordinate measuring machine embodying the present invention; and, FIG. 2 is a perspective view of an alternate coordinate measuring machine embodying the present invention.

With reference now being made to structure and method appearing in the drawings in the Figures, a new precision video gauging machine machine and method for providing coordinate measurement data of a workpiece that embodies the principles and concepts of the present invention and generally designated by the reference numeral 10 will now be described.

With reference to FIG. 1, which shows an embodiment of the present invention 10, in a precision video gauging machine machine 12 for measuring a workpiece 14 includes a base structure 16. This provides a solid and generally rigid foundation on which other structural elements can be placed as well as an aid in maintaining the rigidity and integrity of the various structural elements of the coordinate measuring machine 12.

A carriage 18 is preferably mounted to base 16 and is used for supporting workpiece 14 by a holding mechanism 22, such as a clamp or frictional holder which engages a portion of workpiece 14.

Carriage 18 is vertically movable with respect to base 16 by using a carriage feed mechanism 20 for moving the workpiece supported on carriage 18 and preferably includes a rotatable knob 24 mounted by linkage to carriage 18 and selectively driving a drive member in frictional engagement with carriage 18, whereby when knob 24 is rotated, the linkage drives the drive member to move carriage 18 and supported workpiece 14 vertically with respect to base 16 (as suggested by arrow 26) in a direction based upon the direction of rotation of knob 24. Alternatively, carriage 18 may also be moved vertically by the use of either a screw or pressurized piston arrangement.

The use of vertically movable carriage 18 eliminates the problem of positioning heavy workpieces on a fragile inspection table as is done in many of the present optical measuring machines having horizontally oriented, glass or translucent plastic table tops on which the workpiece is placed. These horizontal inspection tables must be translucent so that clear outlines of the workpiece can be established for measuring by sight or computer imaging systems that rely on a sharp pixel change to determine workpiece outlines. By having a vertical carriage for holding the workpiece there is no limit as to the weight of the workpiece other than the strength of the carriage.

In order to hold workpiece 14 securely in position, it is preferred that a carriage lock mechanism 26 selectively couple and decouple the carriage feed mechanism to carriage 18. Various locking mechanisms are contemplated, among which would be a frictional locking clamp or a pin and hole combination.

A column 28, which is horizontally movable with respect to base 16, is preferably mounted on base 16 in a rigid or fixed position.

However, another preferred embodiment would be to have a horizontal rail structure mounted to the top of column 28 so that column 28 could remain fixed, while the video based coordinate measuring system 30 described below, especially when a video camera is incorporated, could move along the rail structure providing for horizontal movement.

A video based coordinate measuring system 30 is mounted on column 28. It is contemplated that such a video based coordinate measuring system 30 include a video camera 32 capable of producing a video signal having a first optical axis and a focal plane where an image of the workpiece to be measured is focused.

Camera 32 is mounted to move horizontally with respect to the workpiece to be measured and generates an image in the form of a plurality of pixels for later use or processing. Camera 32 may, in one preferred embodiment, be mounted on a sliding rail member that allows camera 32 to be moved along the rail in a sliding engagement generally horizontal to base 16.

In such a video system, a video monitor 34, responsive to the video signal, is connected to video camera 32 and is used for displaying an image of the workpiece on the focal plane of the camera 32.

Since it is contemplated that the invention incorporate operating aspects of a projection coordinate measuring machine, and to aid in imaging workpiece 14 with video camera 32, a first light source 36 is used to backlight illuminate workpiece 14 while it is supported on carriage 18.

Likewise, a second light source 38 is preferred for illuminating the surface of workpiece 14 while it is supported on carriage 18 to provide sufficient light for video camera 32.

It is also preferred that a computer based or a mechanical measuring system be associated with base 16 for measuring the position of video based coordinate measuring system 30. Known acceptable measuring systems abound and are all considered to be within the scope of the present invention.

A feed mechanism for moving video camera 32 includes a rotatable knob 40 is mounted by linkage to base 16 for selectively driving a drive member in frictional engagement with video camera 32, whereby when knob 40 is rotated, the linkage drives the drive member to move video camera 32 horizontally in a direction based upon the direction of rotation of knob 40.

Also, a lock mechanism 42 is provided for selectively coupling and decoupling the feed mechanism to video camera 32 for holding the video camera in place.

Figure 2:
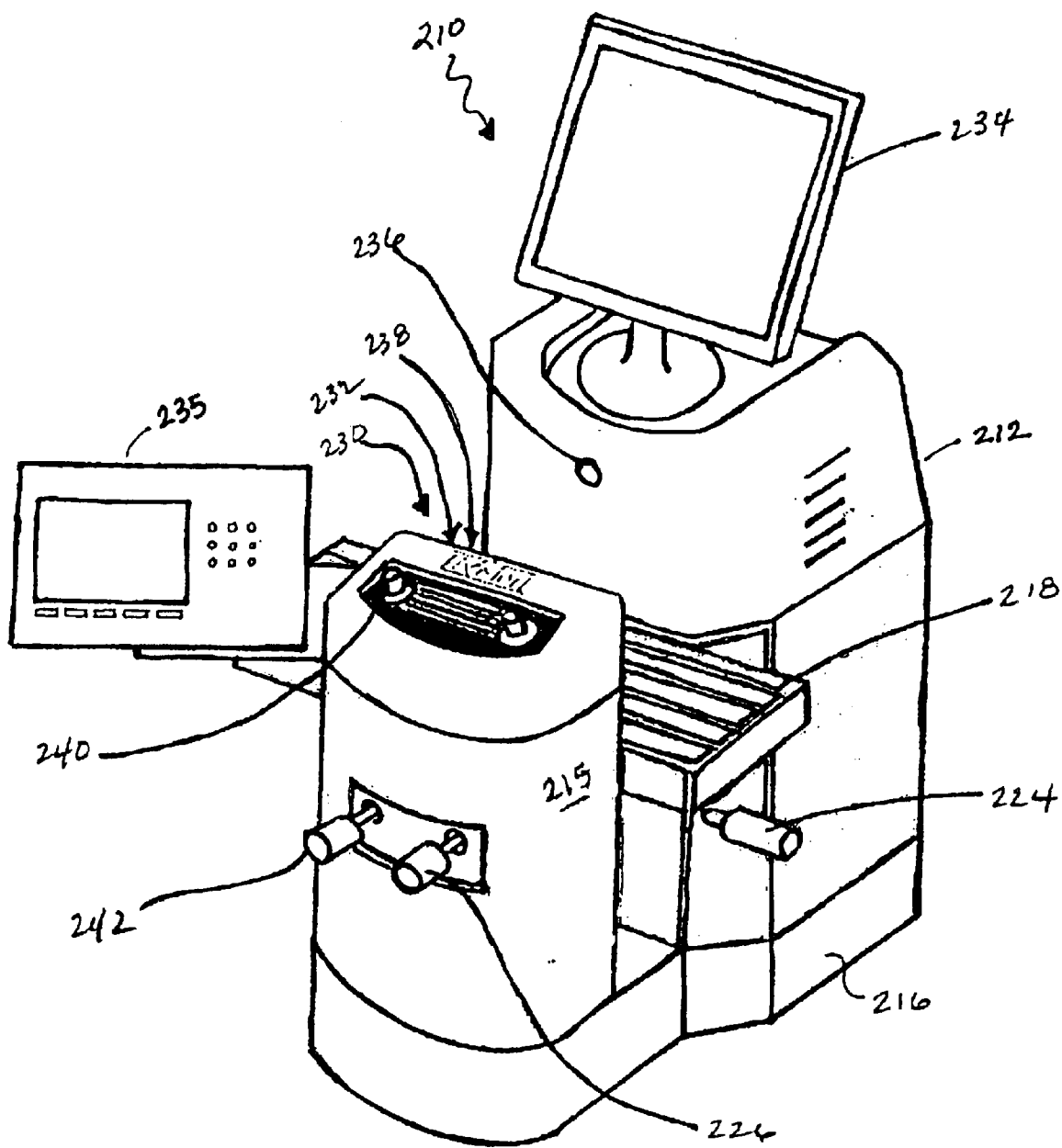

With reference now being made to FIG. 2, which shows an alternate embodiment of the present invention 210, in a precision video gauging machine machine 212 for measuring a workpiece which machine 212 includes a base structure 216. This provides a solid and generally rigid foundation on which other structural elements can be placed as well as an aid in maintaining the rigidity and integrity of the various structural elements of the coordinate measuring machine 212.

A carriage or holding shelf 218 preferably extends from column 215 which is in turn mounted to base 216 and is used for supporting the workpiece which is to be measured. Holding shelf 218 may also include a holding mechanism, not shown, such as a clamp or frictional holder to engage a portion of workpiece to hold it fixed during the measuring procedure.

Holding shelf 218 is vertically movable with respect to base 216 by using a feed mechanism, such as a pneumatic, screw or chain drive mechanism, for vertically moving the holding shelf 218, and consequently the workpiece supported on holding shelf 218 into a desired position for measuring.

Machine 212 preferably includes a rotatable knob 224 mounted by linkage or electronic connection, depending on the ease and efficiency of controlling the specific feed mechanism chosen, to holding shelf 218. Preferably, for ease of control and construction, rotatable knob 224 will be connected by linkage to holding shelf 218 for selectively driving a drive member in frictional engagement with holding shelf 218, so that when knob 224 is rotated, the linkage drives the drive member to move holding shelf 218 and the workpiece supported on it vertically with respect to base 216 in a direction based upon the direction of rotation of knob 224. Alternatively, holding shelf 218 may also be moved vertically by the use of either a screw or pressurized piston arrangement as suggested above.

The use of vertically movable carriage 218 eliminates the problem of positioning heavy workpieces on a fragile inspection table as is done in many of the present optical measuring machines having horizontally oriented, glass or translucent plastic table tops on which the workpiece is placed. These horizontal inspection tables must be translucent so that clear outlines of the workpiece can be established for measuring by sight or computer imaging systems that rely on a sharp pixel change to determine workpiece outlines. By having a vertical carriage for holding the workpiece there is no limit as to the weight of the workpiece other than the strength of the carriage.

In order to hold the workpiece securely in position, it is preferred that a holding shelf or carriage lock mechanism 226 selectively couple and decouple the holding shelf feed mechanism to holding shelf 218. Various locking mechanisms are contemplated, among which would be a frictional locking clamp or a pin and hole combination.

A video based coordinate measuring system 230 is mounted on column 215. It is contemplated that such a video based coordinate measuring system 230 include a video camera 232 capable of producing a video signal having a first optical axis and a focal plane where an image of the workpiece to be measured is focused.

Camera 232 is mounted on or in column 215 and facing the workpiece held on holding shelf 218 so as to allow it to move horizontally with respect to the workpiece to be measured. The camera generates an image in the form of a plurality of pixels for later use or processing. Camera 232 may, in one preferred embodiment, be mounted on a sliding rail member that is fixedly attached to (or even mounted inside of) column 215 that allows camera 232 to be moved along the rail in a sliding engagement generally horizontal to base 216 and the workpiece.

In such a video system, a video monitor 234, responsive to the video signal, is connected to video camera 232 and is used for displaying an image of the workpiece on the focal plane of the camera 232.

Changing focal lenses for the video camera is facilitated by positioning the video camera for horizontal movement at a fixed distance from the workpiece, unlike many current optical measurement machines that require a great deal of downtime and recalibration to change the lenses of their video systems.

Since it is contemplated that the invention incorporate operating aspects of a projection coordinate measuring machine, and to aid in imaging the workpiece with video camera 232, a first light source 236 is used to backlight illuminate the workpiece while it is supported on shelf or carriage 218.

Likewise, a second light source 238 is preferred for illuminating the surface of the workpiece while it is being supported on carriage 218 to provide sufficient light for imaging by video camera 232.

It is also preferred that a computer based or a mechanical measuring system be associated with base 216 for measuring the position of video based coordinate measuring system 230. Known acceptable measuring systems abound and are all considered to be within the scope of the present invention and may preferably include a control panel 235 as shown in FIG. 2.

A feed mechanism for moving video camera 232 preferably includes a rotatable knob 240 (or even a pair of rotatable knobs) is mounted by linkage for selectively driving a drive member in frictional engagement with video camera 232, whereby when knob 240 is rotated, the linkage drives the drive member to move video camera 232 horizontally in a direction based upon the direction of rotation of knob 240.

Also, a lock mechanism 242 is provided for selectively coupling and decoupling the feed mechanism to video camera 232 for holding the video camera in place.

By restricting the movement of the workpiece and video measuring system each to a single axis of movement, the rate of errors introduced into the measuring process is thereby reduced over that of convention machines where the workpiece is located on a table having movement in two axes and the probe mechanism having movement in three axes over the inspection table and workpiece.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A precision video gauging machine system for measuring a workpiece comprising:

a base;

a carriage for supporting the workpiece to be measured, vertically movable with respect to said base;

a carriage feed mechanism for moving the workpiece supported on said carriage including a rotatable knob mounted by linkage to the carriage and selectively driving a drive member in frictional engagement with said carriage, whereby when said knob is rotated, the linkage drives said drive member to move said carriage and supported workpiece vertically with respect to said base in a direction based upon the direction of rotation;

a carriage lock mechanism for selectively coupling and decoupling said carriage feed mechanism to said carriage;

a column, horizontally movable with respect to said base;

a video based coordinate measuring system for measuring the position of a video camera based on a coordinate measuring system, mounted on said column comprising:

a video camera producing a video signal having a first optical axis and a focal plane where an image of the workpiece to be measured is focused, said camera being mounted to move horizontally with respect to the workpiece to be measured and generating an image in the form of a plurality of pixels;

a video monitor responsive to said video signal connected to said video camera for displaying an image of the workpiece being on said focal plane;

a first light source outputting light to backlight illuminate the workpiece supported on said carriage for said video based coordinate measuring system;

a second light source illuminating the surface of the workpiece supported on said carriage for said video based coordinate measuring system;

means associated with said base for measuring the position of said video based coordinate measuring system;

a feed mechanism for moving said video camera of said video based coordinate measuring system means including a rotatable knob mounted by linkage to the base and selectively driving a drive member in frictional engagement with said video camera, whereby when the knob is rotated, the linkage drive the drive member to move the video camera horizontally in a direction based upon the direction of rotation; and, a lock mechanism for selectively coupling and decoupling the feed mechanism to said video camera of said video based coordinate measuring system.

* * * * *